Dec. 28, 1965 L. VADAS 3,225,904
FRUIT PREPARATION MACHINE
Filed July 1, 1963 13 Sheets-Sheet 1

FIG_1

INVENTOR
LESLIE VADAS
BY Hans G. Hoffmeister
ATTORNEY

Dec. 28, 1965 L. VADAS 3,225,904
FRUIT PREPARATION MACHINE
Filed July 1, 1963 13 Sheets-Sheet 4

INVENTOR
LESLIE VADAS
BY *Hans G. Hoffmeister*
ATTORNEY

Dec. 28, 1965   L. VADAS   3,225,904
FRUIT PREPARATION MACHINE
Filed July 1, 1963   13 Sheets-Sheet 5

INVENTOR
LESLIE VADAS
BY Hans G. Hoffmeister
ATTORNEY

Dec. 28, 1965    L. VADAS    3,225,904
FRUIT PREPARATION MACHINE
Filed July 1, 1963    13 Sheets-Sheet 7

FIG_12

INVENTOR
LESLIE VADAS
BY *Hans G. Hoffmeister*
ATTORNEY

Dec. 28, 1965 L. VADAS 3,225,904
FRUIT PREPARATION MACHINE
Filed July 1, 1963 13 Sheets-Sheet 8

FIG_13

INVENTOR
LESLIE VADAS
BY Hans G. Hoffmeister
ATTORNEY

Dec. 28, 1965  L. VADAS  3,225,904
FRUIT PREPARATION MACHINE
Filed July 1, 1963  13 Sheets-Sheet 9

INVENTOR
LESLIE VADAS
BY Hans G. Hoffmeister
ATTORNEY

Dec. 28, 1965   L. VADAS   3,225,904
FRUIT PREPARATION MACHINE

Filed July 1, 1963   13 Sheets-Sheet 10

INVENTOR
LESLIE VADAS

BY Hans G. Hoffmeister
ATTORNEY

Dec. 28, 1965   L. VADAS   3,225,904
FRUIT PREPARATION MACHINE
Filed July 1, 1963   13 Sheets-Sheet 12

INVENTOR
LESLIE VADAS
BY *Hans G. Hoffmeister*
ATTORNEY

INVENTOR
LESLIE VADAS

United States Patent Office 3,225,904
Patented Dec. 28, 1965

1

3,225,904
FRUIT PREPARATION MACHINE
Leslie Vadas, Los Gatos, Calif., assignor to FMC Corporation, San Jose, Calif., a corporation of Delaware
Filed July 1, 1963, Ser. No. 291,997
7 Claims. (Cl. 198—211)

The present invention pertains to fruit processing machines and more particularly relates to machines for halving and pitting peaches.

The present invention provides an improved peach pitting head and improved fruit conveying cups for use in a peach pitting machine of the type disclosed in the A. R. Thompson Patent 2,376,526. In the Thompson machine, a peach is sawed in half along its suture plane, and the pit half is removed from each peach half by making a cut around the curved side of the pit half to free the pit half. Since it is difficult to cut close to the pit, a certain amount of flesh is cut away and lost with each pit half.

In distinction, the pitting head of the present invention removes the pit segments from the peach halves by pulling the pits away from the flesh of the fruit. As a result, the weight yield of fruit processed in the machine is increased because less fruit flesh is lost during separation of the pit segments than is lost by cutting out the pit. Also, the appearance of the pitted fruit is enhanced because the peaches thus pitted have the appearance of the commercially more desirable freestone peach varieties.

Included in the pitting head of the present invention is a novel and efficient combined pit support and pit removing hook that supports each pit segment during positioning of the peach and then rotates to effect a positive removal of the pit.

One of the objects of the present invention is to provide an improved pitting head for a peach pitting machine.

Another object of this invention is to provide a pitting head effective in handling peaches and pits differing widely in size.

Another object of the invention is the provision of improved fruit receiving and carrying cups, operating in conjunction with the pitting head, which facilitate accurate indexing of the fruit with the pitting head.

These objects, as well as other objects and advantages of the present invention, will become evident from the following description and the accompanying drawings in which:

2

The peach pitting head of the present invention (FIGS. 1 and 2) is adapted for use in a peach processing machine M (FIGS. 1 and 2) of the aforesaid Thompson type. The peach processing machine M includes a peach feeding mechanism A that carries manually impaled peaches, having their suture planes disposed in vertical planes, rearwardly to a rotary transfer head B (FIG. 2). The transfer head B removes the peaches from the feed mechanism A and transports them in a circular path through a saw C, that cuts the peaches in half along their suture planes, and then to a pitting head D which pulls the pit segments from the peach halves. The pitted peach halves are then deposited in a discharge chute E which guides the pitted peach halves out of the machine. The present invention is particularly concerned with the transfer head B, and the pitting head D.

Included in the peach feeding mechanism A are two endless roller chains 24 and 25 (FIG. 2) to each of which a plurality of spaced upstanding impaling blades 26 are secured. The two roller chains 24 and 25 are spaced apart at the feed end of the machine, thus providing two spaced feed stations 28 and 30 (FIG. 1) from which the chains converge to carry their respective impaling blades in a single lane leading into the area of the rotary transfer head B. Although the chains 24 and 25 are alongside each other, the blades 26 are offset, as seen in the lower part of FIG. 3, so that they all are in a common vertical plane. The two chains 24 and 25 are trained around idler sprockets, not shown, which are mounted on shafts 32 and 34, respectively (FIG. 1), adjacent the feed stations 28 and 30. Disposed under the saw C are two drive sprockets 36 and 38 (FIGS. 2 and 3) which are fixed on a drive shaft 40 and which simultaneously drive the chains 24 and 25, respectively.

The drive shaft 40 (FIGS. 1–3) is journalled for rotation in bearings 42 and 44 which are secured in respective side plates 46 and 48 of the machine frame. Outwardly of the plate 48, a gear 50 is secured to the shaft 40, and the gear 50 is in mesh with a large drive gear 52. The gear 52 drives a transverse shaft 54 by means including a hub 55 which is keyed to the shaft 54 and is adjustably bolted to the gear 52. The shaft 54 is journalled in bearings 56 and 58 that are each secured to one of the side plates 46, 48.

A small spur gear 60 (FIG. 3) is meshed with the upper portion of the gear 52 and is keyed to a shaft 62 which extends across the machine and through both side plates 46 and 48. The shaft 62 is journalled in bearings 64 and 66, respectively, that are mounted on the side plates 46 and 48. Adjacent the side wall 46, the shaft 62 is secured to a clutch 65 which is driven by a sprocket and roller chain drive unit 67. The chain of the drive unit 67 is trained around a sprocket having a hub 68 which is secured to a shaft 70 of a unitary electric drive motor and transmission 72. The motor and transmission unit 72 (FIG. 2) is mounted on a platform 73a which is part of a rear wall 73 that extends between the side plates 46 and 48. A shaft 70a (FIG. 2) projects from the other end of the motor and transmission unit 72 and adjacent the side plate 48 (FIG. 1), the shaft 70a is keyed to a double groove V-belt pulley 74 which drives a pair of V-belts 76. The belts 76 are also trained around a double groove pulley 78 that is fixed to a shaft 80 which carries the saw C (FIG. 2). The shaft 80 is journalled in a bearing bracket 81 depending from the rear wall 73. During operation of the peach pitting machine M, the motor and transmission 72 provides a continuous rotation of the shafts 54, 62, 70a and 80 in the directions indicated by their respective directional arrows in FIGURE 2.

Each peach impaling blade 26 (FIGS. 1 and 2) has a sharpened edge 82 and a rear or trailing portion extending outwardly beyond the edge 82 that is provided with a rounded, unsharpened leading nose 84. A shroud 86 covers the forwardmost impaling blades adjacent each feed station and, as an impaling blade leaves the shroud and travels toward the machine, each operator aligns the stem indent of a peach with the nose portion 84 while the peach is held with the suture plane substantially vertical. By allowing the nose 84 to firmly seat in the stem indent, and by rotating the peach forwardly and downwardly the sharpened edge 82 is caused to impale the peach along its suture plane. In this position, the long axis of the pit lies substantially parallel to the sharpened edge 82 and the lower edge of the pit is adjacent to, or in contact with, the blade.

As each peach is carried forwardly on the impaling blade 26 (FIGS. 1 and 2) toward the saw C, it passes between two transversely spaced spring-urged centering rollers 88 that are interconnected by gear segments 90 for simultaneous movement toward and away from the impaling blade. The peach is thus urged toward a centered position on the impaling blade. Immediately behind the centering rollers 88, and rotatably mounted in the vertical plane of the impaling blades 26, is a cutting disc 92. The lower portion of the disc 92 cuts into the upper portion of the peach along its suture plane and guides the peach onto a fixed, elongated guide blade 94 which enters the cut made by the disc 92. During movement of the peach along the guide blade 94, two of a plurality of oppositely disposed cup segments 96 (FIG. 3), which are carried by the transfer mechanism B, close upon opposite sides of the peach.

The transfer mechanism B includes a plurality of the cups 96 (FIGS. 2 and 3) which are carried in spaced array by a star shaped hub member 98 (FIG. 13) at one side of the vertical plane in which the impaling blades 26 lie, and an opposed plurality of the cups 96 carried by a similar, but opposite hub member 100 (FIGS. 1 and 3) at the other side of the blades 26. The hub members 98 and 100 are integral with a connecting sleeve 102 which is keyed to the shaft 54. Since the hub members 98 and 100, and the cup mountings associated therewith are identical, although opposite in orientation, a description of the hub 98 and its cup mountings will be sufficient to disclose the construction of hub 100 and its associated parts, and similar parts of the hubs will be given identical reference numerals, with a suffix "a" being added to the numerals associated with hub 100.

Each cup 96 (FIG. 13) is connected to an outwardly directed leg portion 108 of the hub 98 by a bracket 110 which is pivoted to the leg 108 upon a stud 112. As seen at the left side of FIG. 13, the bracket 110 has a central, relatively flat body portion 110A and two arms 111 and 113. The cup 96 is also connected to the leg 108 by a rigid arm 114, shown at the lower left of FIG. 13 which is parallel to the bracket 110 and lies behind the bracket. A stud 116 pivotally mounts the arm 114 to the leg portion 108 of the hub member 98.

Figure 13:
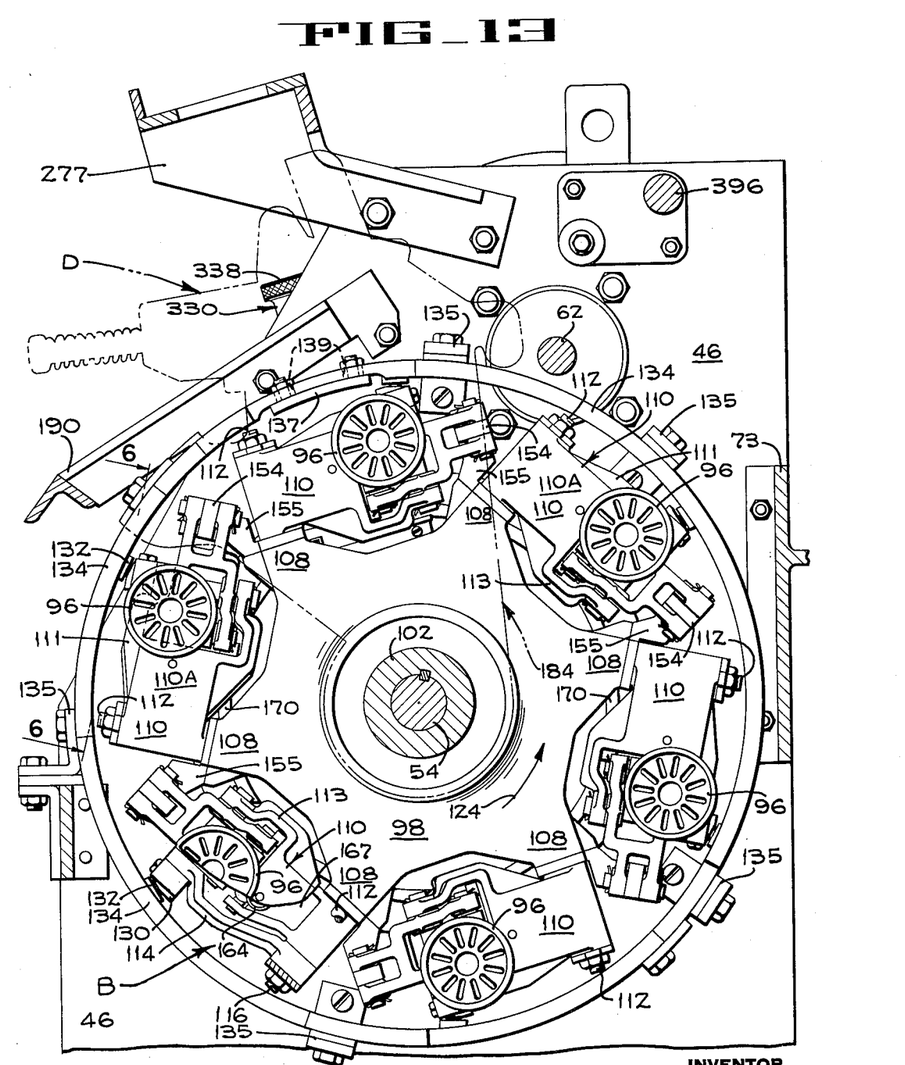
FIGURE 13 is a vertical section similar to FIGURE 12 but with the pitting head of the present invention and other structure removed to show parts otherwise concealed.

The pivotable members 110 and 114 cooperate with other members, not yet described, to form a parallelogram linkage that mounts the cup 96 on the transfer head B for substantially rectilinear movement toward and away from the peach. Before continuing with the description of the cup mounting members, it should be noted that the front side of each cup mounting is shown in FIG. 13 while in FIGURES 4 and 5 the cup mounting is viewed from the rear side. Movement of the cup assembly is in the direction of the arrow 124 (FIG. 13) and movement of each cup segment 96 is in a substantially straight path extending generally parallel to the axis of shaft 54. The free end of each of the lever arms 111 and 113 of bracket 110 is apertured to receive a pivot pin 126 (FIG. 4) and the arm 114 is apertured to receive a pivot pin 128, the two pins 126 and 128 being interconnected by a link 130 that maintains the arms in parallel relation.

Figure 1:
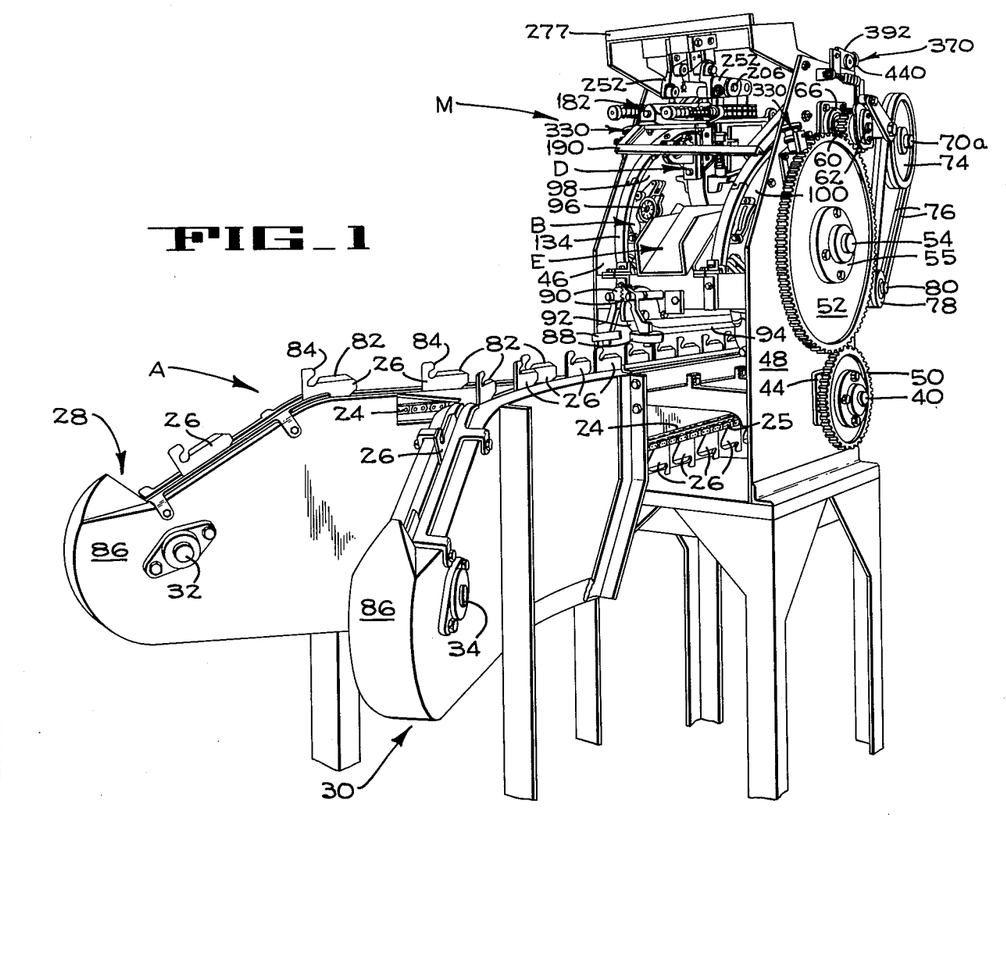
FIGURE 1 is a perspective of a peach pitting machine incorporating the pitting head and cooperating fruit receiving cups of the present invention.
Figure 2:
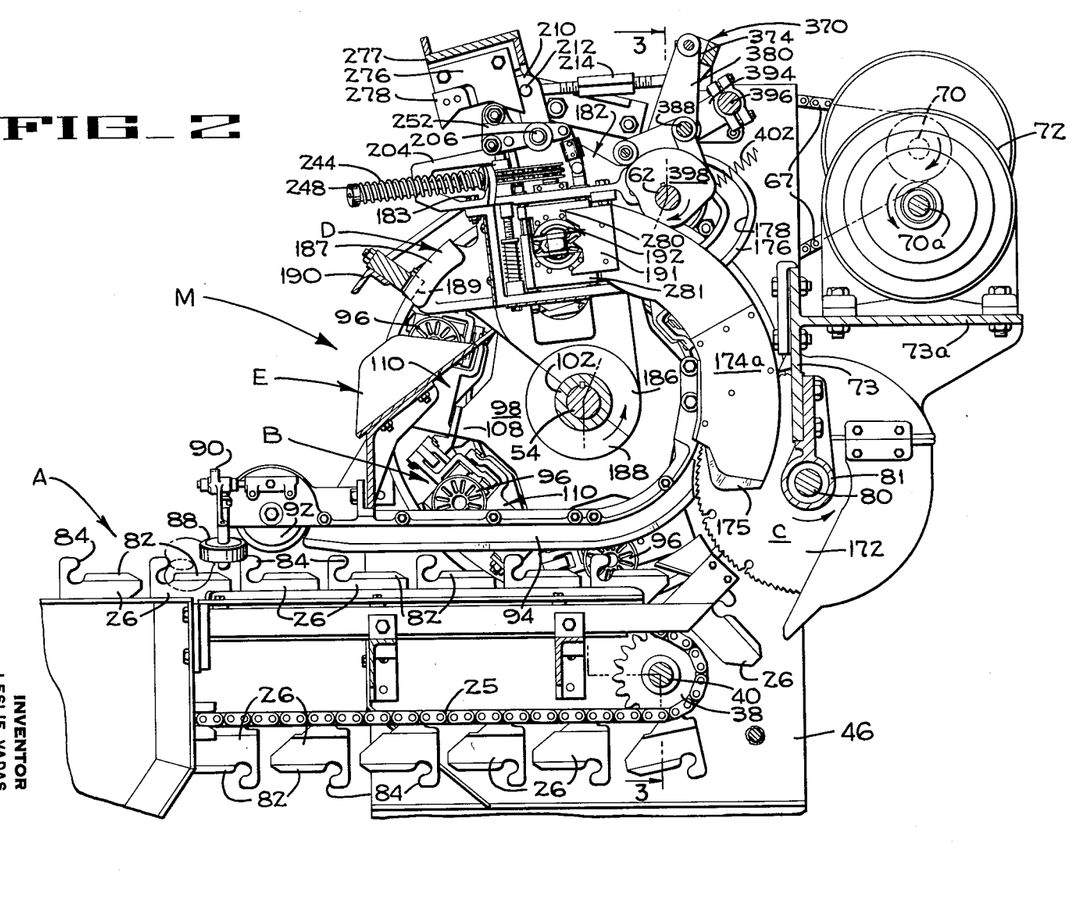
FIGURE 2 is a fragmentary longitudinal section taken inside of the near side plate of the pitting machine shown in FIGURE 1.
Figures 6, 7:
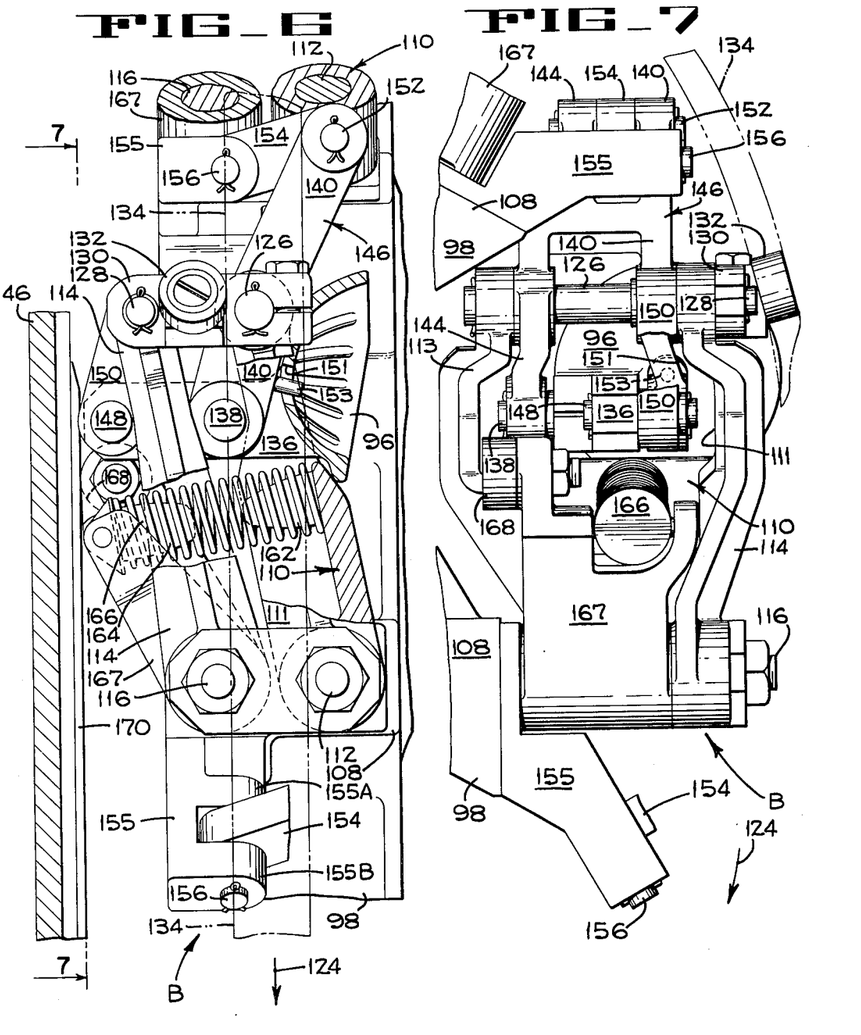
FIGURE 6 is a fragmentary elevation of part of the peach transfer head and is taken on line 6—6 of FIGURE 13.
FIGURE 7 is a section taken on line 7—7 of FIGURE 6.

A cam follower roller 132 is rotatably mounted on the link 130 between the pins 126 and 128, the roller being adapted to roll along a circular camming strip 134 (FIG. 1). The roller is disposed between the side plate 46 and the camming strip 134, as seen in FIG. 6, so that the camming strip 134 limits the inward movement of the cup 96 toward the peach and also provides a retracting means to cause the cup to disengage the peach. Mounting means for the cam strip 134 include a plurality of brackets 135 (FIG. 13) which are bolted to the side plate 46 and to the cam strip. The cam strip 134 is provided with an adjustable camming section 137 which is secured to the cam strip by bolts extending through slotted holes 139. In this way the camming section 137 can be adjusted so as to time the actuation of the cup arms 110 and 114 with the pitting head D.

Each cup 96 is provided with a rearwardly extending integral mounting bar 136 (FIGS. 4–5) which is provided with a slot 136A and two spaced apertures, one at each end of the slot. A pivot pin 138, which is clamped in one of the apertures by a setscrew (not shown), pivotally mounts legs 140 and 144 of a generally H-shaped cup carrying lever 146. The lever 146 is disposed between the arms 111 and 113 of the bracket 110 and is pivoted intermediate its ends upon the pin 126 on which the bracket is pivoted. The other aperture in the slotted cup mounting bar 136 receives a pivot pin 148 in clamped relation, said pin 148 being disposed in one end portion of a link 150. At its other end, the link 150 is pivoted on the pin 128 at the upper end of the previously mentioned lever 114. Each cup 96 is provided with a central aperture 151 (FIGS. 6 and 7) which is entered, when the cup is in the illustrated retracted position, by a peach ejector pin 153 which projects from the inner face of the leg 140 of H-shaped lever 146. The pin 153 effects positive ejection of the peach segment after it has been pitted and the cup 96 has been fully retracted. Referring to FIGS. 6 and 7, it will now be evident that the brocket 110, the arms 113, 114 and link 130 provide one parallelogram linkage for the cup and the link 150 and legs 140 and 144 provide a second parallelogram linkage for the cup, and that the two linkages coact to effect substantially straight line movement of the cup.

As previously mentioned, the lower end of the cup mounting mechanism is pivotally anchored on the parallel studs 112 and 116. The upper end of the mechanism is pivotally anchored on a pin 156 (FIG. 6) that is carried in a bracket 155, one of said brackets 155 being bolted to each leg 108 of the star shaped hub 98, as seen in FIG. 13. Each bracket 155 has spaced ears 155A and 155B (see the lower end of FIG. 6) which receive the anchor pin 156. A link 154 that is pivoted on pin 156 is pivotally connected to the upper end of H-shaped lever 146 by a pivot pin 152.

Figure 8:
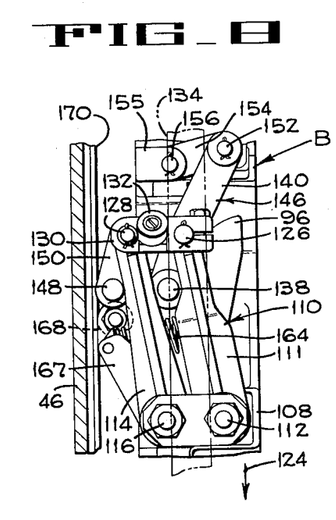
FIGURES 8 and 9 are operational views similar to FIGURE 6, but at a reduced scale.
Figure 9:
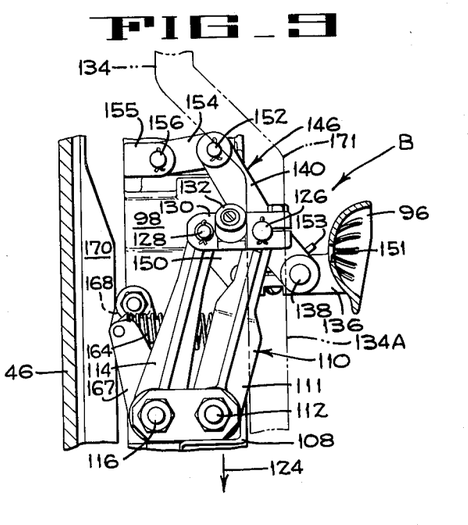

Accordingly, it will be noted that, when the cup 96 swings inwardly from the position of FIG. 8 to that of FIG. 9, the upper parallelogram linkage is anchored by pin 156 while the lower parallelogram linkage is anchored by the studs 112 and 116.

Figure 4:
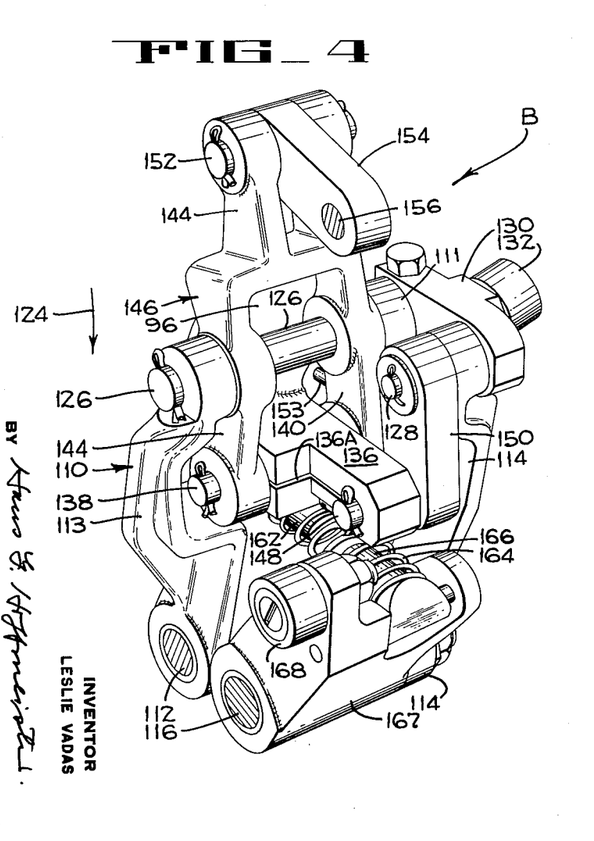
FIGURES 4 and 5 are fragmentary perspective views, respectively, illustrating the mounting means of one half of a peach cup assembly in a retracted position, and the same assembly in an extended position.
Figure 5:
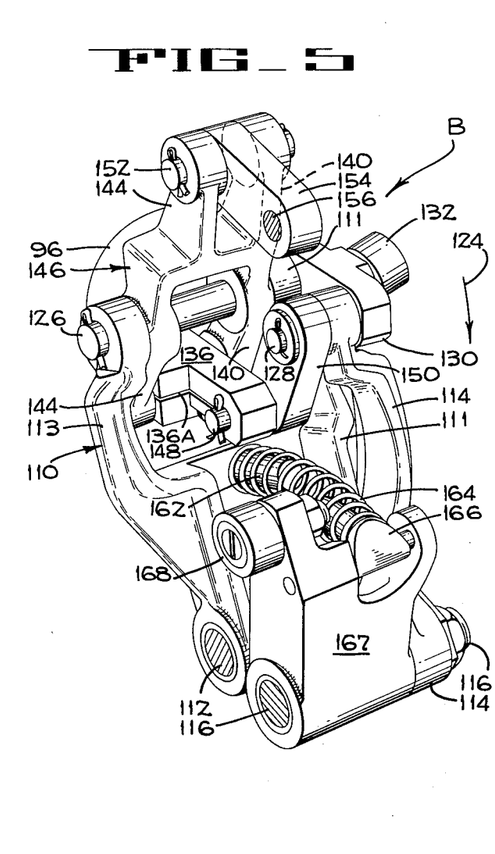

The central body portion 110A of the mounting bracket (FIGS. 6 and 7) is provided with a lug 162 which projects rearwardly and holds one end of a compression spring 164 that is mounted on a similar lug 166 projecting forwardly from the free end of a cam follower bracket 167. The bracket 167 is pivotally mounted on the stud 116. As shown in FIG. 4, a cam follower roller 168 is mounted on the bracket 167 adjacent the pivotal mounting of lug 166. The roller 168 is adapted to roll over the inwardly facing camming surface of a circular cup-actuating camming strip 170 (FIGS. 6 and 12) that is secured to the side wall 46.

Since the cam follower bracket 167 (FIG. 6) is free for pivotal movement on the stud 116, and the cup mounting linkage is prevented from advancing the cup toward the peach by reason of the engagement of the cam roller 132 with the cam strip 134, the compression spring 164 causes the roller 168 on the cam follower bracket 167 to remain engaged with the cam 170 and causes roller 132 to remain engaged with cam strip 134.

At an appropriate point adjacent the lower sector of the transfer mechanism B, (FIGS. 9 and 13), the cam strip 134 has a laterally offset portion 134A, at a point beginning approximately at 171, which allows the cam roller 132 to move inwardly toward the peach, thus permitting the compression spring 164 to move the cup mounting bracket 110 toward the peach. The peach carried by one of the impaling blades 26 is thereby engaged and gripped in an opposed pair of the cups 96 for movement with the transfer mechanism B. This movement of the cup toward the peach, it will be seen by reference to FIGURES 8 and 9, is in a substantially rectilinear path and is normal to the suture plane of the peach.

Because the pressure exerted by each cup on the peach segment is brought about solely by the compression spring 164, the cup will maintain pressure on the peach segment when, as will be later described, the segment moves laterally outward during its forward movement. A positive index movement of the cup with the peach is effected regardless of any backlash which may exist in the linkages because the cup path is straight, and backlash can only affect the cup movement toward or away from the peach.

Since the spacing between adjacent impaling blades 26 (FIG. 2) is closer than the spacing between adjacent pairs of feed cups 96, it will be evident that the transfer head B rotates to advance the peach at a greater speed than the speed at which the blades 26 are moved. Accordingly, the peach is gripped in the cups and is moved rearwardly away from the impaling blade 26 over an upwardly curved rear portion of the fixed guide blade 94.

Figure 3:
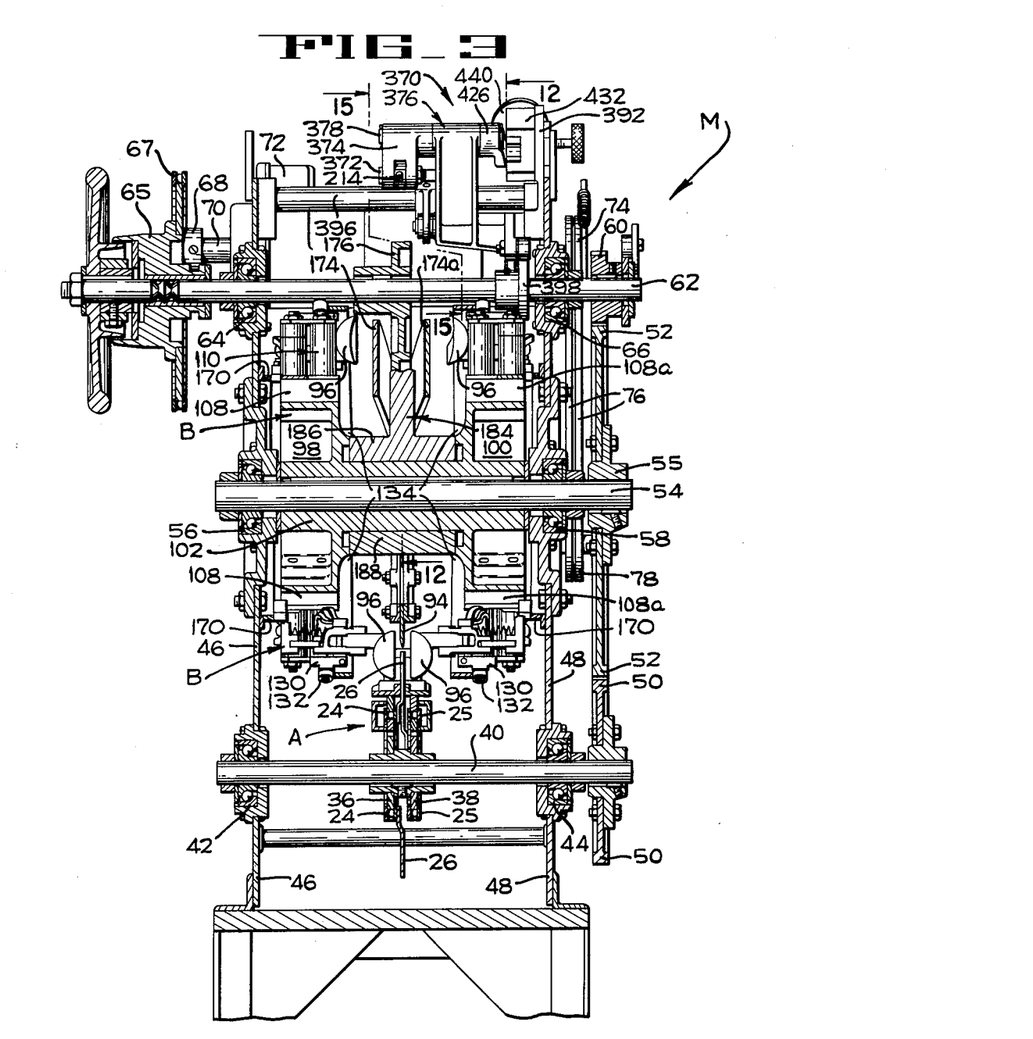
FIGURE 3 is a vertical section taken on line 3—3 of FIGURE 2.

The saw C (FIG. 2) has a circular blade 172 which is rotatably mounted in the same vertical plane as the blades 26 and 94, with the peripheral edge of the saw blade being located near the end of the guide blade 94. As the peach is carried by a pair of the cups 96 through the path of the saw blade 172, the peach and the pit are severed into two portions. Immediately following the sawing operation, the halves of the peach are separated by two juxtaposed, arcuate and diverging spreader blades 174 and 174a (FIGS. 2 and 3). The lower ends of the separating blades lie adjacent the saw blade 172 and each blade has a lower end portion 175 (only one being shown) which is feather-edged to provide a smooth transition surface for the halved peach moved upwardly onto the blade.

The peach halves are slid along the diverging spreader blades 174, 174a (FIGS. 2 and 3) by the transfer mechanism B, and at a point above and slightly ahead of the shaft 54, the forwardly moving peach halves index with the pitting head D when the head is at the rearward limit of its reciprocating movement.

As is clearly seen in FIGURE 2, the upper end of the spreader plate 174a is provided with a peach support plate 191 which is coplanar with the outer surface of the spreader plate. A similar peach support plate, not seen, is fixed to the other spreader plate and each plate 191 lies adjacent a pit removing assembly 192 of the pitting head D when the head is in its rearmost position. Each peach half is slid over the associated plate 191, by the cup 96 of the transfer head B, to an indexed position with a pit removing assembly 192, at which time the pitting head D moves toward the feed end of the machine in synchronism with the cups 96. During this movement the half pit in each segment is removed from the peach in a manner to be presently described.

Figures 14, 14A:
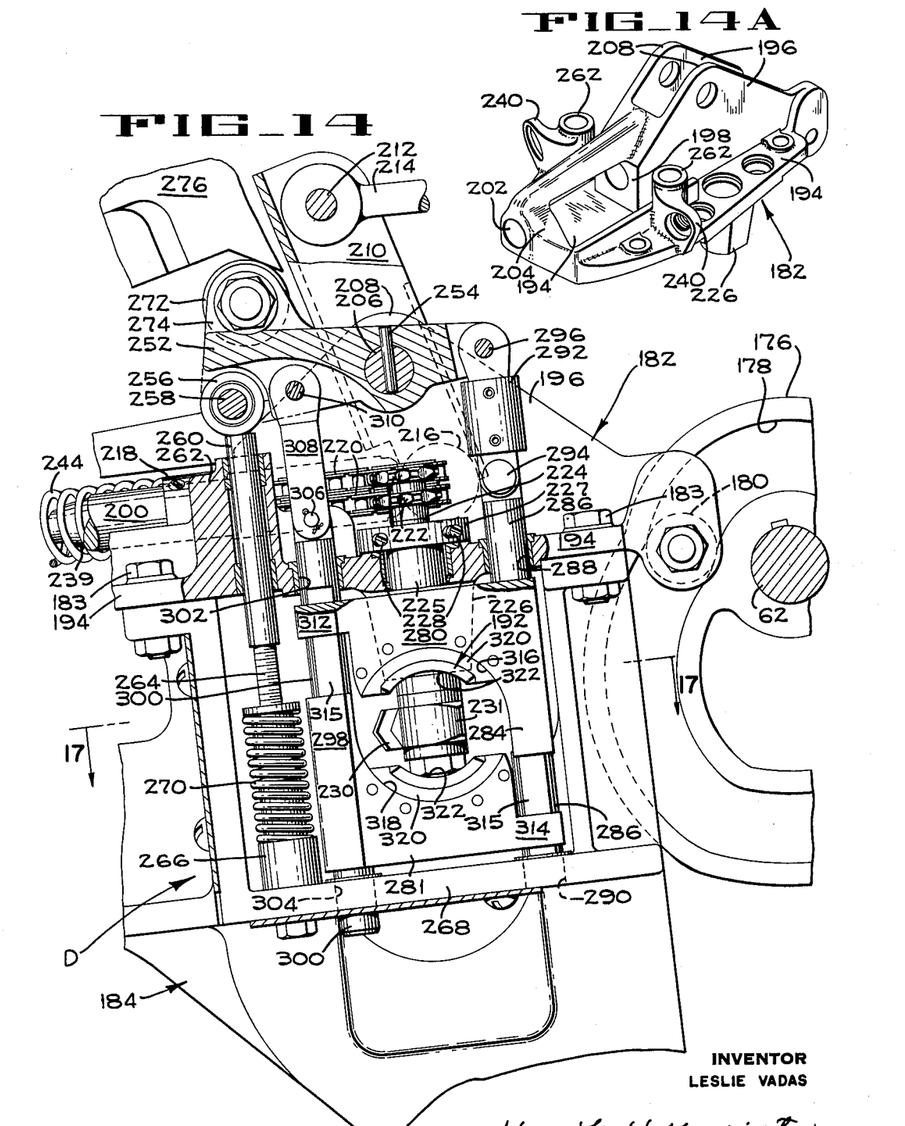
FIGURE 14 is a fragmentary elevation, partly broken away, of the pitting head of the present invention in position for receiving the unpitted halves of a peach.
FIGURE 14A is an isometric of a casting which forms the main frame and upper portion of the pitting head.

The pitting head D (FIG. 12) is reciprocated in the machine M by means of a pitting head cam 176 which is mounted for rotation with the shaft 62 and is disposed between the side plates 46 and 48. The pitting head cam 176 has a cam groove 178 in one side face which receives a cam follower roller 180, the roller 180 being pivoted to a top casting 182 (FIG. 14) of the pitting head. The top member 182 is secured by bolts 183 to the upper surface of a vertically elongate main body casting 184. The lower end portion of the body 184 is provided with a semicircular hub 186 that is journalled for free rotation on the sleeve 102 (FIG. 3) between the two hubs 98 and 100.

Figure 17:
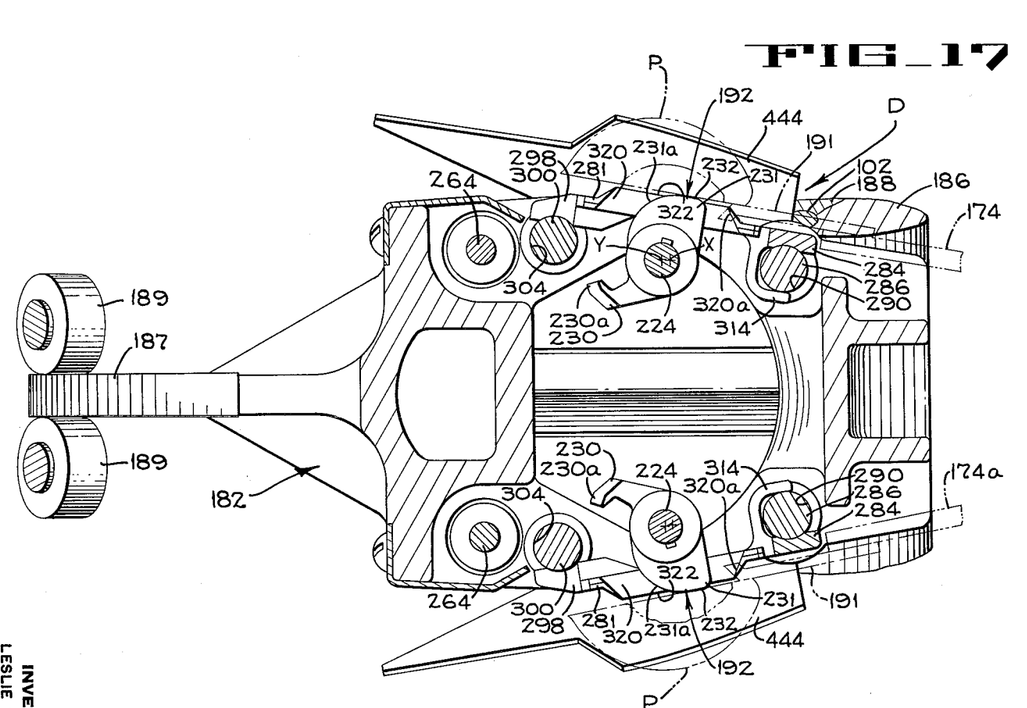
FIGURE 17 is a generally horizontal section through the pitting head illustrated in FIGURE 14, and is taken on line 17—17 thereof.
Figure 18:
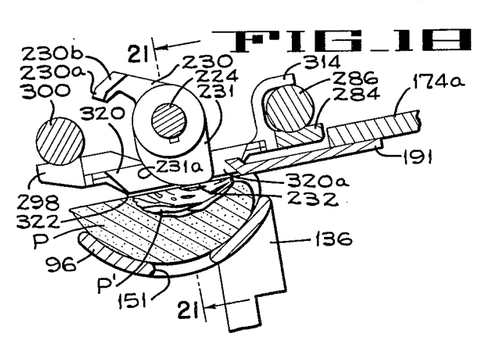
FIGURES 18–20, inclusive, are successive diagrammatic operational views illustrating the removal of the pit segments from a peach half.
Figure 19:
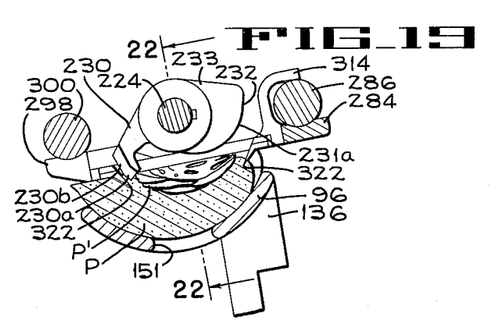

A semicircular bearing cap 188 (FIG. 12) is bolted to the hub 186 to permit pivotal mounting of the pitting head on the sleeve 102. In order to prevent lateral movement of the pitting head, the forward end of the body 184 (FIGS. 2 and 12) has a vertically disposed outwardly projecting arcuate guide bar 187 formed integral therewith which is held between two fixed guide rollers 189 (FIG. 17). The rollers 189 are mounted on a generally U-shaped bracket 190 (FIG. 1) extending between, and bolted to, the side plates 46 and 48.

Figure 16:
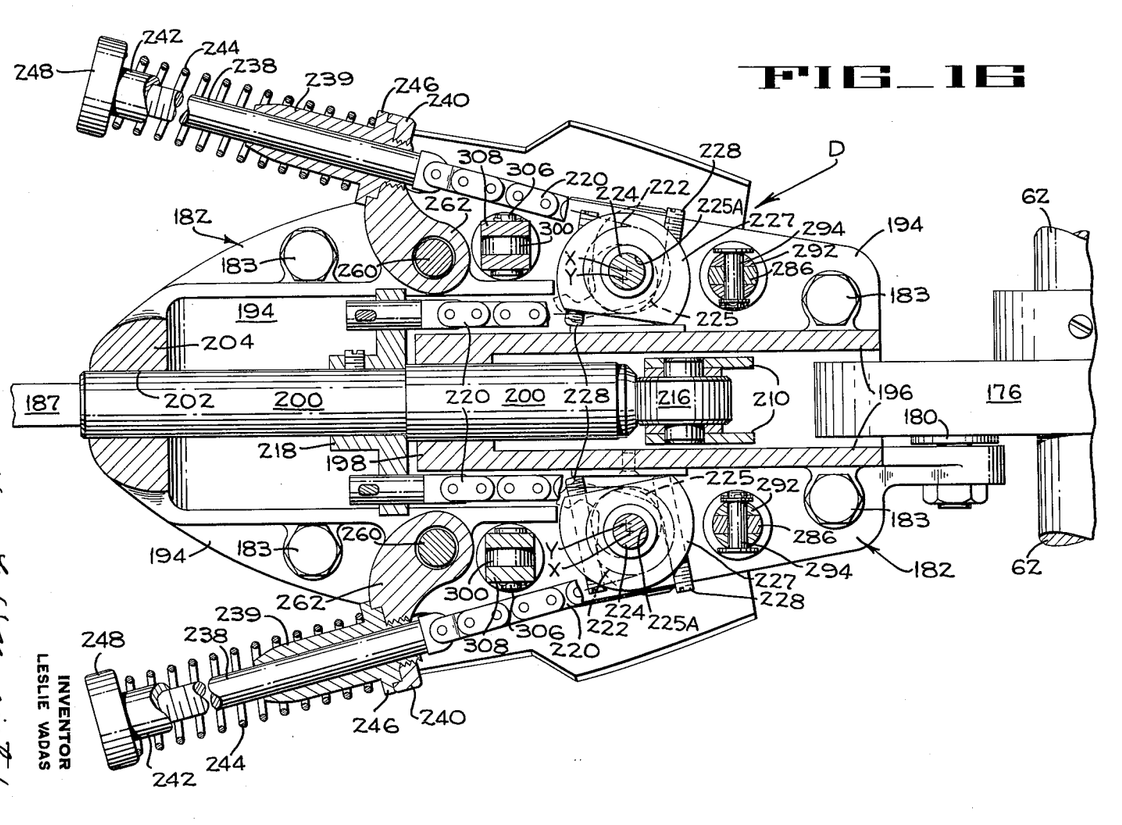
FIGURE 16 is a substantially horizontal section of the pitting head of the present invention and is taken on line 16—16 of FIGURE 12.

The pitting head D includes two of the pit removing assemblies 192 (FIGS. 14, 16 and 17) which are transversely aligned and oppositely constructed so as to each confront one of the peach segments moved along the spreader blades 174 and 174a. Accordingly, a description of one pit removing assembly 192 is equally applicable to the other, and the similar parts in both assemblies are given the same reference numeral.

The top member 182 of the pitting head D comprises a generally flat top plate 194 which has two integral longitudinally extending, upwardly projecting flanges 196 (FIG. 14A) that are interconnected at their forward ends by an apertured wall 198. A pit hook actuating shaft 200 is slidably disposed in the wall 198 and extends through an aligned aperture 202 in a boss 204 which is formed on the front end portion of the flange 194. Adjacent and above the rear end of the shaft 200, a transverse pivot shaft 206 (FIG. 14) extends through aligned apertures provided in the uppermost portions 208 of the flanges 196.

Disposed between the upper portions 208 and pivoted upon the shaft 206 is a channel-shaped actuating lever 210 which is pivotally secured adjacent its upper end by a pin 212 to an actuating link 214. As will be explained presently, the lower end of lever 210 is operatively engaged with the sliding shaft 200 and it is the general function of the link 214 to prevent forward movement of the upper end of the channel shaped lever 210 as the pitting head D is moved forward in the machine by the cam 176 so as to slide the pit hook actuating shaft 200 relative to the pitting head.

The lower end portion of the lever 210 (FIGS. 14 and 16) carries a roller 216 which bears against the adjacent end of the pit hook actuating shaft 200. It will be seen, therefore, that when the pitting head D moves toward the feed end of the machine from its rearmost position illustrated, in FIG. 14, the lever 210 will pivot around the shaft 206 and the roller 216 will cause the shaft 200 to slide forwardly in the pitting head.

When the shaft 200 is moved forward relative to the pitting head, a crosshead 218 (FIG. 16) which is secured thereto intermediate its ends, simultaneously pulls two pit hook actuating roller chains 220. Each chain 220 is of double-width construction (see FIG. 14) and is trained around a pair of associated sprockets 222 (indicated by pitch lines in FIG. 16). Each pair of sprockets is secured to a pit hook shaft 224 which is journalled for rotation in a cylindrical sleeve 225 that extends through a depending boss 226 (FIG. 14A) formed on the top plate 194 of the body 182.

It is to be noted that each pitting hook shaft 224 (FIG. 16) is received in an eccentric bore 225A in the sleeve 225 and rotates around an axis indicated by the cross X. Each cylindrical bearing sleeve 225 is rotatable in the boss 226 around an axis indicated by the cross Y. This mounting of the pitting hook shafts 224 permits the shafts to be adjusted toward or away from the respective peach segments. The upper end of each bearing sleeve 225 (FIGS. 14 and 16) has an integral collar 227 which abuts the upper surface of the flange 194. A set screw 228 is threaded through the collar at each side of the shaft 224 and the inner ends of the set screws 228 bear against the flange 196. By adjusting the set screws, the rotative position of the bearing sleeve 225 can be adjusted and this rotation, accordingly, moves the axis Y of the pitting hook shaft 224 toward or away from the peach.

The lower end portion of each pitting hook shaft 224 has a pitting hook 230 (FIGS. 14 and 17) secured thereon. Integrally formed with the pitting hook 230 is a pit support block 231 which is movable in the same plane as the hook. The pit support block 231 has a generally flat outer surface 232 which is positioned, when in a peach receiving condition, substantially coplanar with the support plate 191 at the upper end of each spreader plate 174 or 174a.

The double chain 220 (FIG. 16) is connected to one end of a rod 238 which is slidably disposed in a bearing sleeve and spring mount 239 that is screwed into an outwardly projecting threaded ear 240 of the top plate 194. The other end of the rod 238 is threaded and has a combination spring seat and spring retainer element 242 screwed thereon. A compression spring 244 is mounted on the rod 238 and is held in compression between a collar 246 of the bearing sleeve 239, and a collar 248 of the spring seat 242, to normally tension the chains 220.

Accordingly, when the pitting head D is moved forwardly in the machine by the cam 176 to cause sliding forward movement of the shaft 200 relative to the pitting head, the crosshead 218 exerts a pull on the chains 220, thus compressing the springs 244 and rotating the associated pitting hook shafts 224. When the pitting head D returns to its former position, the compressed springs return the chains 220 and sprockets 222 to their initial positions. During each rotation of the pitting hook shafts 224, each pitting hook 230 is carried through approximately 180° of angular movement to effect removal of the pit segment. This pitting operation is most easily observed in conjunction with the progressive operational views in FIGURES 18–23 and will later be more fully explained.

Both ends of the pivot shaft 206 (FIG. 14) project outwardly beyond the adjacent ears 208 of the flanges 196, and a rocker arm 252 (FIG. 1) is secured to each end by a pin 254. The forward end portion of each rocker arm 252 is provided with a roller 256 that is mounted for rotation on a rod 258 and bears against the upper end of a shaft 260 which is slidable in an upstanding boss 262 of the top plate 194. The lower end of the shaft 260 is provided with a threaded bore, not seen, in which is adjustably threaded a spring holder 264. In alignment with the spring holder 264 is a spring holder 266 that is bolted to an outwardly directed lower flange 268 of the pitting head body casting 184. The two spring holders 264 and 266 cooperate to mount a compression spring 270 therebetween which urges the shaft 260 upwardly.

Each rocker arm 252 carries a cam follower roller 272 which is rotatably mounted on an upstanding integral tab 274 of the arm, the roller being held by the force of the spring 270 in engagement with the lower edge of a cam plate 276. The cam 276 depends from a fixed transverse bridge 277 (FIG. 12) which is bolted to the side plates 46 and 48. The cam 276 includes a nose portion 278 which is adjustably bolted through a slot 280 to the fixed portion of the cam 276.

Reciprocating movement of the pitting head D causes the cam 276 to depress the forward end of the rocker arm 252 at each limit of the pitting head stroke, while the spring 270 maintains contact of the rocker arm roller 272 with the cam. The resultant rocking movement of the rocker arm 252 (FIG. 14) opens and closes two superposed, coplanar and cooperating cutter support plates 280 and 281 that are slidably disposed between the flanges 194 and 268 of the pitting head D.

In the rearmost position of the pitting head (FIG. 2) the fruit support plate 191 of each spreader plate partially overlaps the associated pair of peach support plates 280 and 281. Thus, as can be seen in FIGURE 17, as each peach half P is advanced by a cup 96 into an indexed position with the pitting head D, its cut face is supported on the fruit support plate 191 and its pit half rests on the pit support 231 of the pitting hook.

The cutter support plate 280 on each pit removing assembly 192 (FIGS. 14 and 17) is formed with a long side 284 which is secured to a shaft 286 that is slidably mounted in aligned apertures 288 and 290 of the top plate 194 and the bottom flange 268, respectively. The upper end of the shaft 286 carries a link 292 pivoted thereto by a pin 294, the link also being pivotally connected by a pin 296 to a bifurcated rear end of the rocker arm 252.

The cutter support plate 281 is provided with a long side 298 that is secured to a shaft 300 which is slidable in aligned apertures 302 and 304 of the top plate 194 and the bottom flange 268, respectively. The shaft 300 has its upper end pivotally connected by a pin 306 to a link 308 which is pivotally secured to the forward end of the rocker arm 252 by a pin 310. It will, accordingly, be apparent that rocking movement of the rocker arm 252 in the manner already described will cause the peach support plates 280 and 281 to move toward and away from each other. During such movement of the peach support plates, their coplanar relationship is maintained by a forked end 312 (FIG. 14) of plate 280 and a forked end 314 of plate 281, which respectively embrace flat portions 315 of the actuating shafts 300 and 286.

The plates 280 (FIG. 14) and 281 are provided with arcuate recesses 316 and 318, respectively, which are adapted to form, when the plates 280 and 281 are in abutting relation, an elliptical pitting opening through which the pitting hook 230 moves to remove the pit from a peach half. The recess 316 and 318 of each peach support plate 280 and 281 is provided with a blade 320 (FIGS. 14 and 17) affixed thereto, said blade having an arcuate cutting edge 322 lying in a plane outwardly from the associated cutter support plate 280 or 281, but slightly inward of the outermost surface 232 of the pit support boss 231.

Each blade 320 converges in both directions from the center of the pitting aperture along the stem-blossom axis of the associated peach segment. The inner surfaces of each pair of adjacent blades cooperate to form an arcuate pit camming surface 320a, by which means the pit, when it is later moved endwise by the pitting hook 230, is cammed inwardly away from the flesh of the peach.

When the peach halves P (FIG. 17) are positioned with their pit segments P' contacting their respective pit supporting bosses 231, and the pitting head D is moved forwardly in the machine by the cam 176, the pitting hook shafts 224 rotate, in the manner previously described, to remove the pit supports 231 from engagement with the pits. Accordingly, the spring-urged peach cups 96 push the peach halves inwardly toward the cutting edges 322 of the gripping blades 320 as the pit supports 231 move inwardly away from the peach segments. Simultaneously with the forward motion of the pitting head D, the rocker arm 252 (FIG. 14) is pivoted around the shaft 206, causing upward and downward movement, respectively, of the shafts 286 and 300. The cutting edges 322 of each cooperating pair of blades 320, therefore, move toward each other and into the peach flesh adjacent the outer curved surface of the pit segment.

Figure 10:
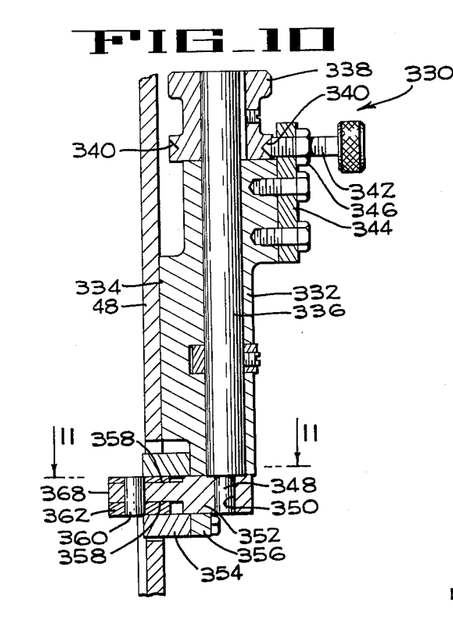
FIGURE 10 is a fragmentary section of one of two identical oppositely disposed mechanisms for adjusting the gripping pressure of a pair of cooperating fruit cups which grip and transport the peach.
Figure 11:
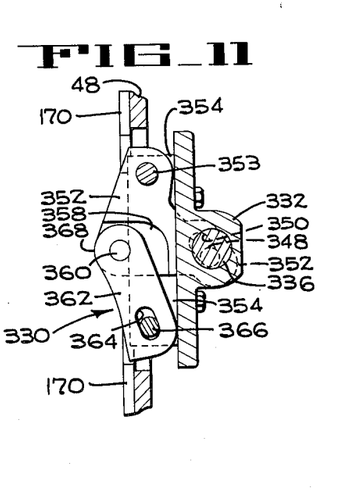
FIGURE 11 is a section of the mechanism shown in FIGURE 10 and is taken on line 11—11 thereof.

While the blades 320 of plates 280 and 281 are closing, the pitting hook shafts 224 move from the initial position shown in FIGURE 17 to simultaneously advance the pit hooks 230 toward the peach following removal of the peach pit supporting bosses 231 from engagement with the pit. At the same time, each cup 96 is given an additional thrust toward the peach segment P, in order to positively secure the peach against lateral movement during removal of its pit, by means of an adjustable camming unit 330 (FIGS. 10 and 11).

One camming unit 330 is mounted on each side plate 46 and 48 (FIG. 1) opposite one of the cam follower rollers 168 of the aligned pair of cups 96 which are indexed with the pitting head D in its rearmost position. The two camming units 330 are identically constructed, but opposite, and therefore a description of the unit illustrated in FIGS. 10 and 11 will serve to disclose the other unit also.

The camming unit 330 (FIGS. 10 and 11) includes a tubular body 332 which has a flat body portion 334 that is secured to the side plate 48. A shaft 336 extends through the body 332 and has a hand-knob 338 fixed to its upper end. The knob 338 is provided with a series of circumferential detents 340, any one of which may be engaged by the pointed end of a locking screw 342 for immobilizing the shaft 336 in a selected rotative position. The locking screw 342 is threaded through a plate 344 which is bolted to the tubular body 332. A lock nut 346 secures the screw 342 in the selected detent 340.

The lower portion of the shaft 336 is formed with an eccentric and depending integral rod 348 which is disposed in a slot 350 provided in a cam segment 352. The cam segment 352 is pivoted by a pin 353 to a horizontally slotted block 354 that is bolted to an elongate mounting pad 356 of the tubular body 332. The cam segment 352 has an upper and lower recessed portion 358 and is provided with a pivot pin 360 that passes through a bifurcated end, which embraces the recessed portions 358, of another cam segment 362. The other end of the cam segment 362 has a slot 364 in which is disposed a guide pin 366 that is fixed in the block 354.

It will be apparent in FIG. 11 that as the shaft 336 is rotated, the eccentric rod 348 will traverse the slot 350 in the cam segment 352, thus pivoting one end of the segment 352 about the pin 353 and moving its other end toward or away from the center of the machine. At the same time the cam segment 362 will have a similar motion due to the interconnecting pin 360 of the two cam segments. This described movement of the cam segments provides an adjustable ramp 368 which extends into a gap in the upper sector of the cam strip 170 (FIG. 12) to fill the gap and form a part of the cam strip. The ramp 368 is so located that it is engaged by the cam follower roller 168 (FIG. 9) of the cup 96 at the time the pitting hook 230 begins to rotate to cam the pit segment from the peach.

Figure 12:
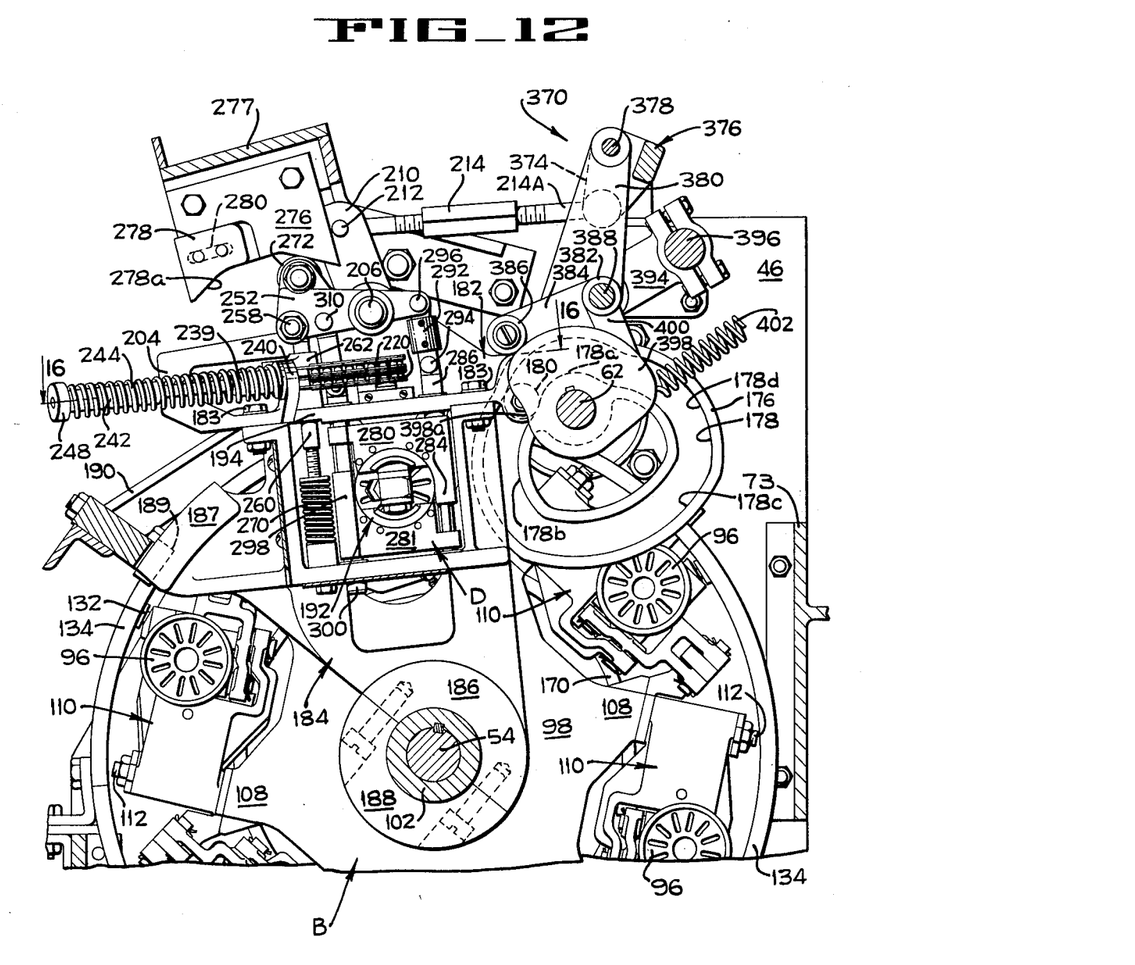
FIGURE 12 is an enlarged fragmentary section taken on line 12—12 of FIGURE 3.
Figures 15, 15A:
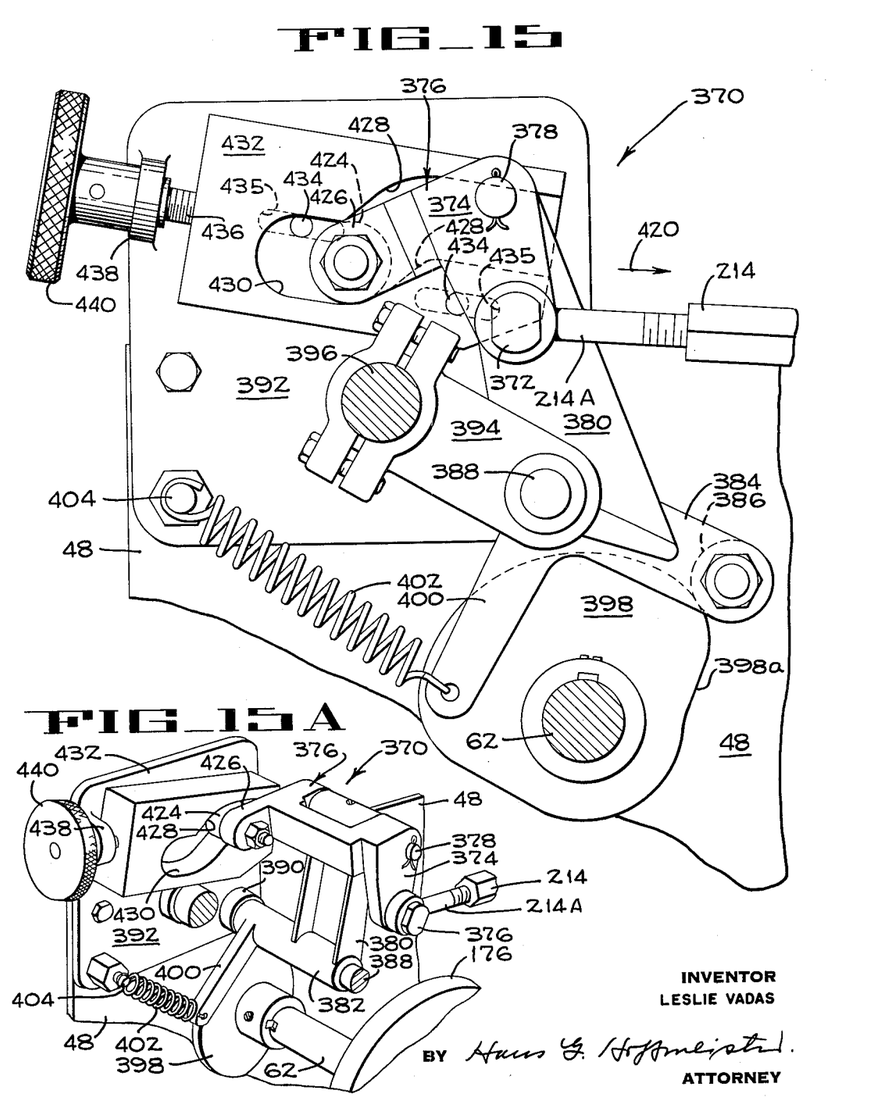
FIGURE 15 is a fragmentary vertical section taken on line 15—15 of FIGURE 3 and particularly illustrates a timing mechanism for controlling the pitting head.
FIGURE 15A is a fragmentary perspective of the timing mechanism illustrated in FIGURE 15.

When the roller 168 is moved over the inner vertical edges of the two cam segments 352 and 362, the cam follower bracket 167 (FIG. 9) is urged toward the peach segments. The spring 164 is thus compressed beyond the compression already caused by the cam 170 and forces the associated cup 96 into a more firm engagement with the peach. This additional thrust of the peach cups is made necessary by the fact that the various lots of fruit processed are not always of uniform ripeness. A green peach thus requires more holding pressure by the cups 96 than does a ripe peach and the camming units 330 allow for the cup pressure to be changed as required. Means are provide to adjust the timing of the pit hook rotation in order that the pitting head D may be preset to accommodate different ranges of pit sizes which may be accommodated with a given size of gripping blades 320. This adjustment is effected by a pitting head timing mechanism 370 (FIGS. 12, 15 and 15A). It will be recalled that when the pitting head D (FIG. 12) is moved forwardly in the machine, the link 214 which is pivoted to the upper end of the lever 210, causes the lever 210 to rotate around the shaft 206. By means of the pit hook actuating shaft 200 (FIG. 16) and its associated chains 220 and other mechanism already described, the pit hooks 230 are simultaneously rotated during pivoting of lever 210 to cam the pit segments from the peach halves.

Referring to FIGURES 15 and 15A, the end 214A of the link 214, which is remote from the pitting head D, is connected by a pivot pin 372 to an arm 374 of a cam-actuated pivotal bracket 376 that is part of the timing mechanism 370.

The bracket 376 is pivoted upon a rod 378 that is carried in the end portion of a swinging arm 380. The arm 380 is formed on a hub 382 (FIG. 15A) which has a forwardly extending cam follower arm 384 (FIG. 15) and a cam follower roller 386 pivoted to the arm. The hub 382 is provided with an axial shaft 388 which is fixed in a hub 390 that is formed on a plate 392, the plate 392 being bolted to the side plate 48. The other end of shaft 388 is fixed to a support bracket 394 that depends from a transverse frame reinforcing shaft 396.

A disc cam 398 is mounted on the shaft 62 in a vertical plane which includes the follower roller 386. A rearwardly extending tension spring 402 is connected to an arm 400 of the hub 382 and to a frame bolt 404 in order to maintain contact of the roller 386 with the cam 398. The cam roller 386 (FIG. 15) is illustrated in a position on the cam 398 corresponding to the time when the pitting head D is in its rearmost position and will next move forwardly in synchronism with a peach. As the pitting head D moves away from the timing mechanism 370, the rotation of the disc cam 398 causes a reduced diameter camming surface 398a of the cam to be moved under the follower roller 386. Since the pitting head D is moving forwardly, the link 214 is urged in the direction of the arrow 420 (FIG. 15) and the arm 380 pivots clockwise around the pivot shaft 388 as follower 386 moves along the cam surface 398a. Up to this time the pitting hooks 230 are not actuated because the forward motions of the link 214 and the pitting head D are at approximately the same velocities.

Continued advancement of the pitting head D causes the arm 380 to carry forwardly the pivot bracket 376 to which the link 214 is attached. Thus, a follower roller 424 that is pivoted to an arm 426 of the pivot bracket 376 rolls up an inclined or arcuate portion 428 of a cam groove 430 in which the roller is disposed. When the roller 424 traverses the cam groove portion 428, it will be seen that the arm 426 will be pivoted clockwise (FIG. 15) about rod 378 and cause the arm 374, to which link 214 is attached, to pull the link rearwardly and rotate the pitting hooks 230 in the manner previously described.

The cam groove 430 is formed in a cam block 432 which is secured to the plate 392 by bolts 434 that are threaded in tapped holes in the plate 432 and have outer end portions slidable in slots 435 formed in the plate 392. The block 432 can be adjusted fore and aft on the plate 392, when the bolts 434 are loosened, by means of a stud 436 which is threaded into one end of the block 432. The stud 436 is rotatable, but axially immobile, in an ear 438 of plate 392 and is provided with a knurled knob 440 on its outer end so that the block 432 may be moved to any position within its limits of movement.

From the foregoing, it will be evident that the position of the cam block 432 controls the timing of the pitting hook actuation in relation to the position of the pitting head D, because the cam groove 430 in the block controls the time at which the pitting hooks begin to rotate.

*Operation*

The pit removing sequence of operations will be described with reference to FIGURES 12 and 18 to 23, inclusive. At its rearward limit of movement the pitting head D dwells until the segments of a peach carried by a cooperating pair of the cups 96 attain positions wherein their pits P' are substantially indexed with the openings defined by the pit finder blades 320. This rearward dwell period of the pitting head D is effected by a dwell portion 178a (FIG. 12) of the cam groove 178 in the pitting head cam 176.

As soon as the peach halves are indexed with the openings in the pit finder blades 320, the cam follower 180 of the pitting head D is caused to accelerate the pitting head forwardly in the machine in synchronism with the cups 96, by means of a camming portion 178b. Later, after the head D has been moved to its forward limit, the head is caused to dwell in that position by an outer dwell portion 178c of cam 176. The head is carried to its rearward limit, after its forward limit dwell, by a camming portion 178d whereby it again dwells at its rearward limit to index with the next pair of cups 96.

As the pitting head D moves forwardly in synchronism with the aligned peach segments, the camming portion 398a (FIG. 15) of the cam disc 398 withdraws support from the roller 386 and the pivot arm 380 swings forwardly due to the pull of spring 402 and the pull exerted by the pitting head actuating link 214. Near the end of this forward movement of the arm 380, the link 214 is arrested by the timing mechanism 370 and the pitting hooks 230 (FIG. 16) begin their rotation to cam out the pit segments.

At the time each peach segment P (FIGS. 17, 18 and 21) reaches its properly indexed position with the temporarily immobilized pitting head, the flat pit support surface 232 of the pit support block 231 is substantially coplanar with the discharge plate 191 and is in a position holding the cut face of the pit P' outwardly beyond the path of the cutting edges 322 of the pit gripping blades 320. The peach P is being urged toward the pit hook 230 at this time by the force of the cup spring 164 (FIG. 9) which is being compressed by the camming ramp 368 (FIG. 11).

As the pit hook 230 (FIGS. 17, 19 and 22) begins its rotation, a curved transition surface 231a thereof moves into contact with the pit P'. The profile of the transition surface 231a is such that it progressively moves away from the pit P' whereby the peach segment is moved inwardly by the force of the cup spring 164. Meanwhile, the forwardly moving pitting head D has brought the cam roller 272 (FIG. 12) of the pit gripping actuating mechanism into contact with a depending portion 278a of the cam 278 whereby the pit gripping blades 320 move toward each other and enter the peach flesh to substantially surround the pit P'.

Figure 22:
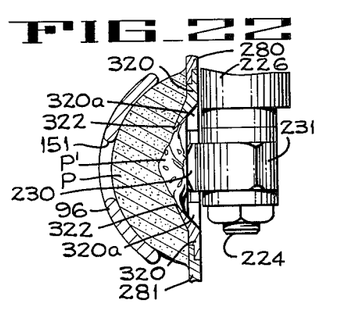
Figure 23:
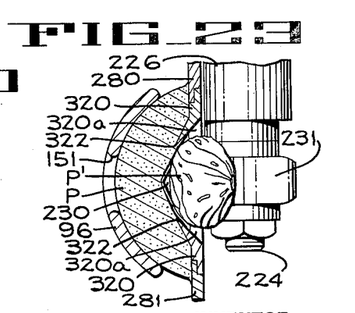

As can be clearly seen in FIGURE 22, the medial portions of the pit gripping blades 320 close upon the sides of the pit and firmly engage the same. If the pit is a very small one, it is possible for the pit gripping blades 320 to close until they abut and the pit is entirely surrounded; normally, though, the area of contact of the pit with the gripping blades 320 is limited to the portions adjacent the central portions of the longitudinal edges of the pit. In either event, the sloping cutting edge walls 322 of the gripping blades 320, which blades converge in both directions along the stem to blossom axis of the fruit and form the cooperating camming surfaces 320a, cause the pit P', when it is moved in a similar, axial direction, to be cammed out of the pit cavity of the peach.

Figure 20:
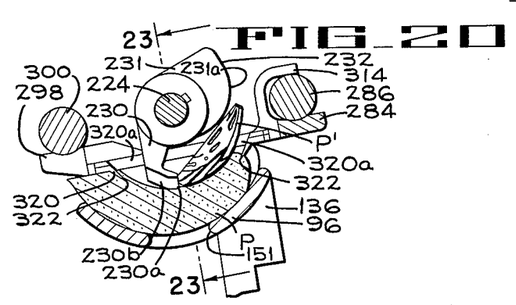
Figure 21:
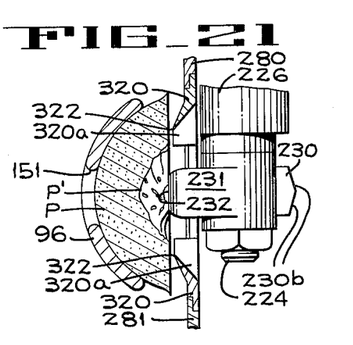
FIGURES 21–23, inclusive, are diagrammatic operational sections taken on corresponding section lines shown in FIGURES 18 to 20, respectively.

The pit camming operation is shown in FIGURE 20 wherein a blunt nose portion 230a of the pitting hook 230 has been moved to contact and push the pit whereby the converging camming surfaces 320a presented by the inner faces of the pit gripping blades 320 cause ejection of the pit along an arcuate path. It is to be especially noted that the peach flesh adjacent the stem end of the peach and defining one end of the pit cavity is not harmed because the pit is under positive control of the camming surfaces 320a to move the pit inwardly away from the flesh. Also, as is shown in FIGURES 20 and 21, the outer surface of the pit hook is beveled at 230b so that the shape of the hook which sweeps through the pit cavity conforms closely to the shape of the cavity. In this way any broken pit fragments are bodily removed from the cavity along with the pit. A wing-like shield 444 (FIG. 17) is secured to each side of the pitting head D below each pitting hook 230 whereby the pits and pit fragments are collected and carried to guide means, not shown, which directs the pit and pit fragments away from the pitting head.

After the pit segments have been removed from the split peach, the cams 134 (FIGS. 8, 9, and 12) retract the two cups 96 carrying the peach and one of the ejection pins 153 enters the aperture 151 in each cup and forcibly ejects the pitted peach half if gravity alone does not cause it to drop away from the cup into the discharge chute E (FIG. 2). The same cycle will then repeat for the next succeeding peach after the camming groove portion 178d of cam 176 returns the pitting head D to its rearward position.

While a particular embodiment of the present invention has been shown and described, it will be understood that the particular details herein set forth are capable of modification and variation without departing from the principles of the invention, and that the scope of the invention should be limited only by the scope and proper interpretation of the claims appended hereto.

I claim:

1. In a fruit processing machine, a driven rotatable turret, a cup having a substantially central aperture and an arcuate inner face adapted to engage an ovoid fruit, a leg extending from the outer face of said cup at one side of the aperture, a lever pivotally connected to said cup leg, an ejection pin mounted on said lever and projecting toward the cup in approximate axial alignment with said aperture, parallelogram mounting means including said lever for pivotally mounting said cup to said turret for substantially linear movement of the cup in a path toward and away from the turret, and camming means engageable with said cup mounting means for moving the cup along said linear path, movement of said cup in a direction away from said turret causing said ejecting pin to project through said aperture in order to forcibly eject the fruit from the cup.

2. In an apparatus for pitting fruit, fruit transport means comprising, a turret, a fruit receiving cup carried by said turret for transporting fruit in a path substantially parallel to the general plane of said turret, said cup being in the form of an arcuate shell having a centrally located aperture extending through the wall of the shell, parallelogram linkage means connecting said cup to said turret for movement substantially normal to the general plane of said turret, and a fruit ejector pin carried by said cup mounting linkage in a position where said pin will project through said aperture into the fruit receiving recess of the cup when said cup is adjacent said turret.

3. In a fruit processing machine, a driven turret including a hub, first and second arms of equal length pivoted to said hub, a cup lever having one end pivotally anchored to said hub and an intermediate portion pivotally connected to the free end of said first arm, a fruit cup having a projecting leg pivoted intermediate its ends to the other end of said cup lever, a first link pivotally interconnecting the distal end of said cup leg and the free end of said second arm, and a second link pivotally interconnecting the free ends of said first and second arms to maintain the arms parallel to one another, the distance between the pivotal connections of said cup leg to said second arm being substantially equal to the distance between the pivotal connections of said cup lever to said first arm.

4. In a fruit processing machine, a driven rotatable turret including a hub, first and second arms of equal length pivoted to said hub, a cup lever having one end pivotally anchored to said hub and an intermediate portion pivotally connected to the free end of said first arm, a fruit cup having a projecting leg pivoted intermediate its ends to the other end of said cup lever, a first link pivotally interconnecting the distal end of said cup leg and the free end of said second arm, a second link having a cam follower roller and pivotally interconnecting the free ends of said first and second arms to maintain the arms parallel to one another, and camming means engageable with said cam follower roller for effecting relative movement between said cup and said hub, the distance between the pivotal connections of said cup leg to said second arm being substantially equal to the distance between the pivotal connections of said cup lever to said first arm.

5. In a fruit processing machine, a driven rotatable turret, a cup having a substantially central aperture and a concave inner face adapted to engage an ovoid fruit, a cup leg extending from the outer face of said cup at one side of the aperture, a lever pivotally connected to said cup leg, an ejecting pin mounted on said lever and projecting toward the cup in approximate axial alignment with said aperture, and parallelogram mounting means including said lever pivotally mounting said cup to said turret for effecting substantially linear movement of the cup along a path in a direction away from the turret through a distance sufficient to cause the free end of said ejecting pin to be positioned beyond said concave inner face of said cup.

6. In a fruit processing machine, a fruit support cup having a substantially central aperture and a concave inner face adapted to engage an ovoid fruit, a cup leg extending from the outer face of said cup at one side of the aperture, a lever pivotally connected to said cup leg, an ejecting pin mounted on said lever and projecting toward the cup in approximate axial alignment with said aperture, and movable through the aperture upon relative pivotal movement between said lever and said leg, and means for causing relative pivotal movement between said lever and said leg.

7. Apparatus according to claim 3 wherein each of said pivotal connections comprises pivot means having a pivotal axis lying in a plane parallel to the general plane of said turret, and wherein said cup is mounted for movement along a substantially linear path parallel to the axis of rotation of said turret.

References Cited by the Examiner
UNITED STATES PATENTS

| | | | |
|---|---|---|---|
| 1,314,398 | 8/1919 | Hendrickson | 198—211 |
| 1,963,036 | 6/1934 | Trolley | 198—211 |
| 2,556,122 | 6/1951 | Thompson | 198—219 X |
| 3,045,731 | 7/1962 | Vadas et al. | 146—28 |
| 3,132,675 | 5/1964 | Reimers et al. | 146—28 |

ROBERT C. RIORDON, *Primary Examiner.*

J. SPENCER OVERHOLSER, *Examiner.*